July 25, 1933.　　　G. W. AMOR　　　1,919,353

COUPLING DEVICE

Filed March 14, 1931　　　3 Sheets-Sheet 1

INVENTOR
George William Amor
BY
ATTORNEY

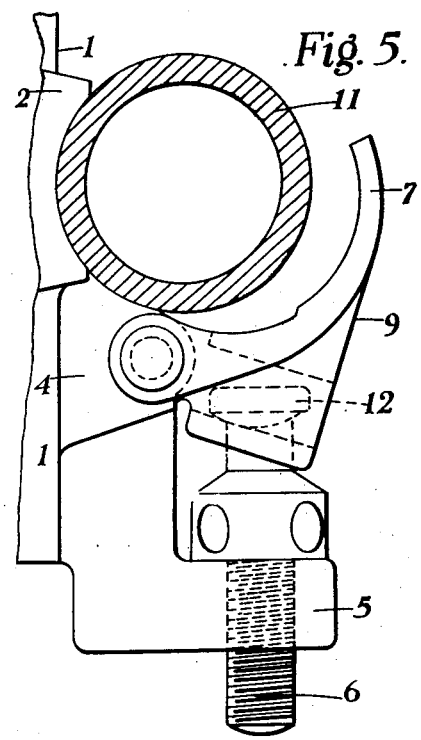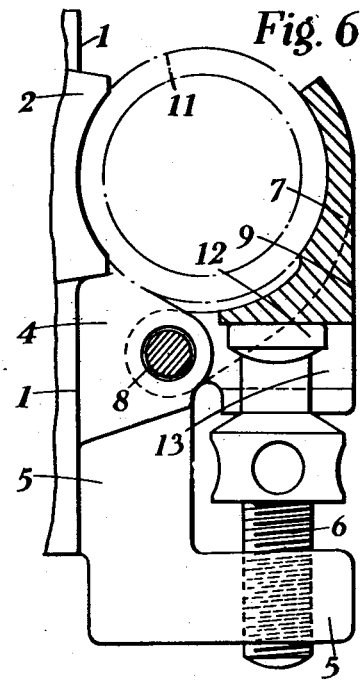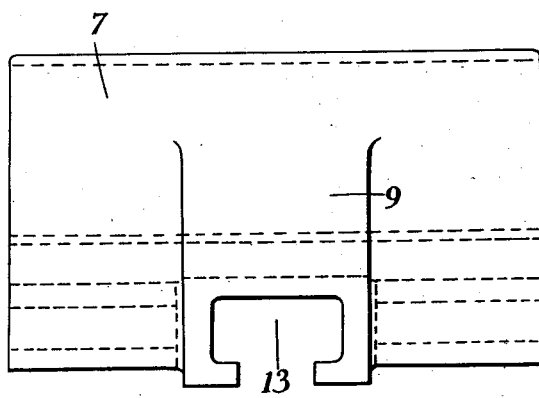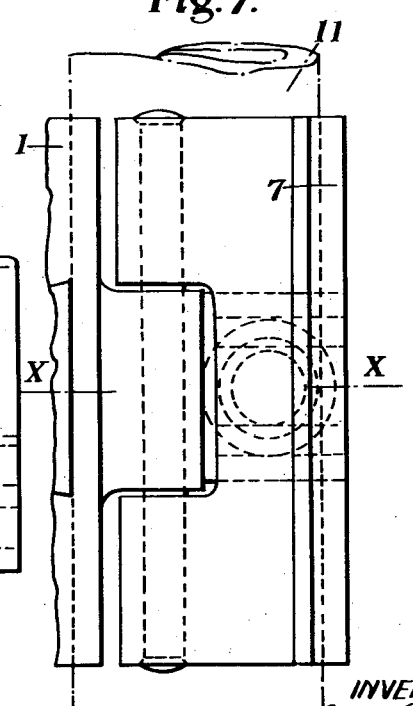

Patented July 25, 1933

1,919,353

UNITED STATES PATENT OFFICE

GEORGE WILLIAM AMOR, OF NORBURY, ENGLAND

COUPLING DEVICE

Application filed March 14, 1931, Serial No. 522,744, and in Great Britain April 17, 1930.

This invention relates to coupling devices for use in the erection of scaffolding or like temporary structures of the type comprising a main body member having a clamping jaw integrally formed on opposite sides thereof, the major axis of each of said jaws being disposed at right angles one to the other, a hinged clamping jaw co-operating with each of the first mentioned jaws and clamping screws to coact with the body member and hinged jaws to grip the poles to be supported, and in particular to coupling devices for securing scaffold and like poles in position.

In such devices it is essential that there shall be no loose parts which can be accidentally or otherwise detached therefrom or be damaged in handling, and the object of the present invention is the construction of a device which will fulfill these requirements and one which embodies characteristics resulting in ease of manipulation and efficiency in operation.

The invention therefore consists of a clamping device in which the clamping screw is not directly connected with or carried by the movable clamping jaw but is irremovably mounted in the main body member and positioned relatively to said movable jaw with which it coacts, so that when moved in one direction it permits the movable jaw to open and when moved in the reverse direction it forces the movable jaw into its clamping position.

The invention will be further described with reference to the accompanying drawings, wherein:—

Figure 5 is a side elevation of a further embodiment of the invention;

Figure 6 is a part sectional elevation on the line x—x of Figure 7;

Figure 7 is a plan view of Figure 6, and,

Figure 8 is a front elevation of the hinged jaw shown in Figures 5 and 6.

Figure 1:
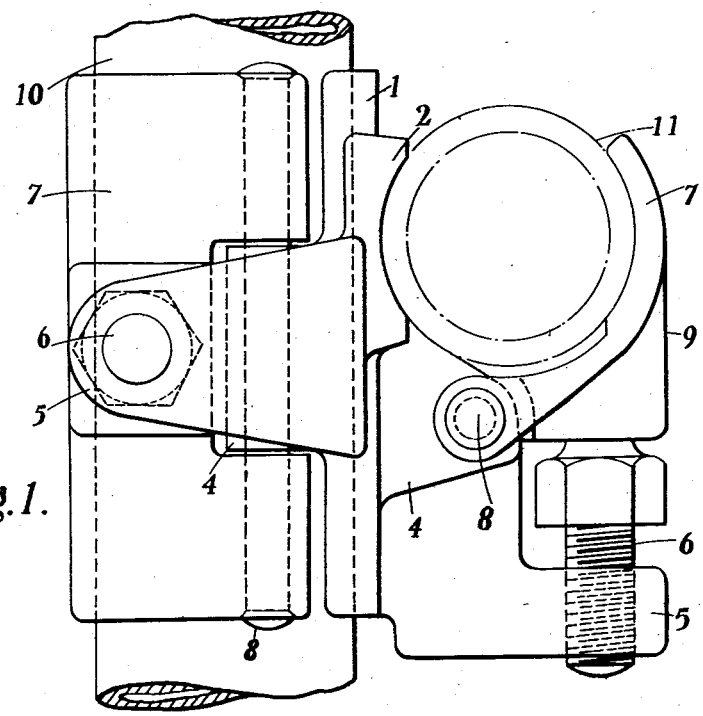
Figure 1 is a side elevation of one embodiment of the device.
Figure 2:
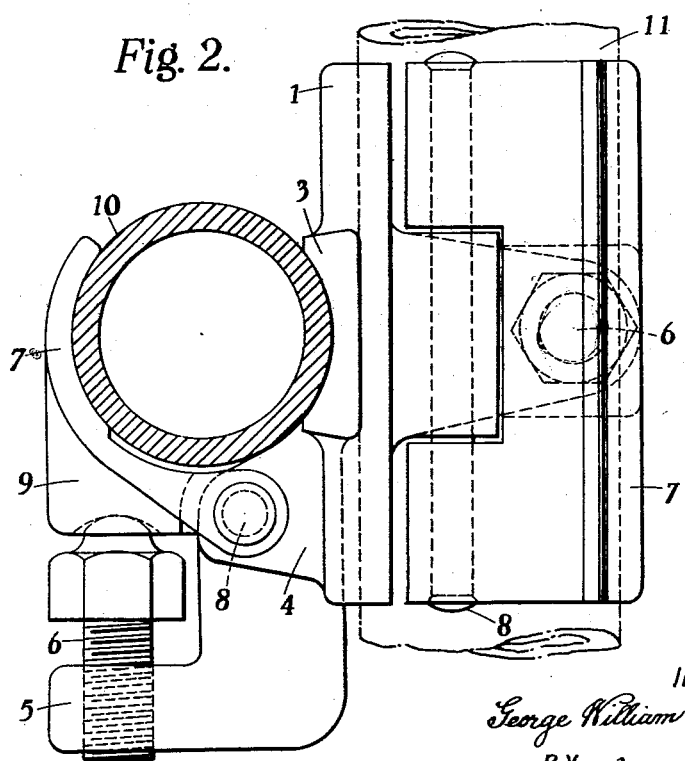
Figure 2 is a plan of Figure 1.

Referring more particularly to Figures 1 and 2, the device comprises a main body member 1 having on opposite sides thereof integrally formed jaws 2, 3, with their longer axes disposed at right angles to each other, and lugs 4 and 5, the latter being provided with a screw threaded hole to receive a clamping screw 6. Clamping jaws 7 are pivotally mounted, by means of hinge pins 8, in the lugs 4, said jaws being provided with an abutment 9 with which the head of the screw 6 co-operates.

In operation, when it is desired to secure a ledger pole 11 to a scaffold pole 10, the jaws 7 are opened out by screwing the screw 6 into the lug 5 and when the device is placed in the desired position on the scaffold pole 10 the screw 6 is unscrewed and, the head of the screw bearing against the abutment 9, effects the separation of the abutment 9 from the lug 5 and the consequent clamping of the jaw 7 against the pole 10. With the device thus secured and the other jaw 7 opened out the ledger pole 11 may be placed in position and the jaw 7 closed in the manner above described.

Figure 3:
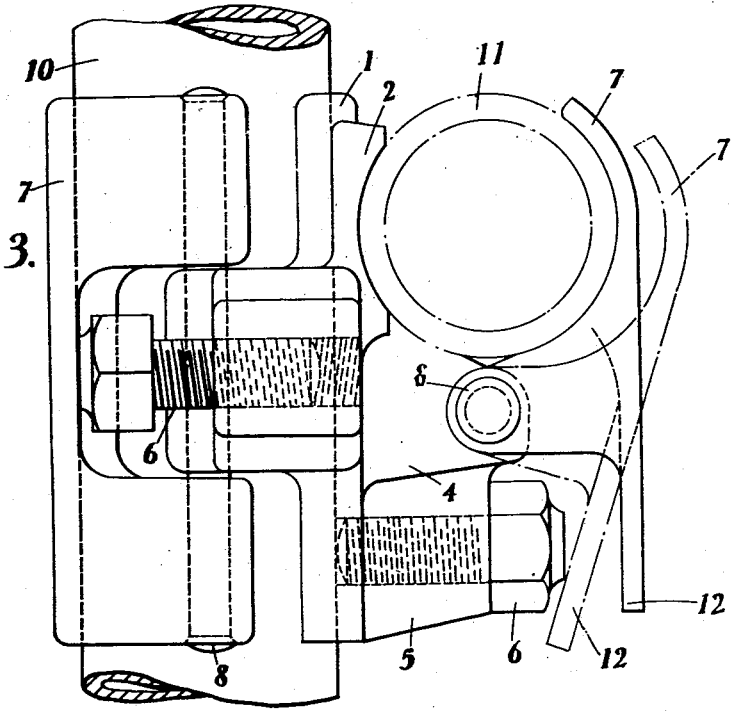
Figures 3 and 4 are similar views of a modification.
Figure 4:
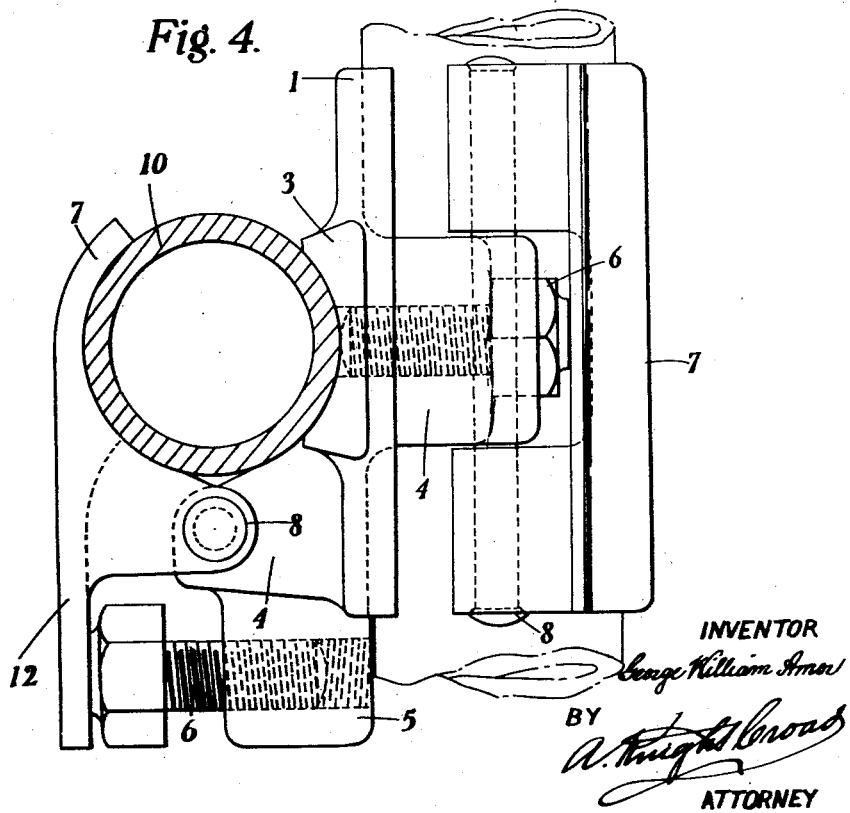

In the modification shown in Figures 3 and 4, the clamping screws 6 have a movement perpendicular to the body member 1, and the hinged clamping jaws 7 are constructed with extensions 12 with which the respective clamping screws 6 co-operate.

Figures 5 to 8 illustrate a further embodiment wherein the clamping screw 6 is constructed with an enlarged head 12 which is located in a recess 13 formed in the abutment 9 of the hinged jaw 7. As will be understood, axial movement of the screw 6 in either direction will cause the head 12 to coact with the upper or lower surface of the recess 13 and move the hinged jaw 7 toward or away from the main body member 1. The size of the recess 13 is such as to permit of a small angular adjustment of the jaw 7 in relation to the screw head 12.

It will be obvious that in a device constructed in accordance with this invention, the movement of the hinged jaw 7 is at all times governed and determined by the axial movement of the clamping screw 6, and the replacement of the hinged jaw 7 to the gripping position is completely and mechanically effected by rotation of the clamping screw 6.

The length of the threaded portion of the clamping screw 6 and the limit of angular movement of the hinged jaw 7 is such that the screw 6 cannot be completely unscrewed and detached from the lug 5 without removing the hinged jaw 7 from the device.

While the lugs 5 are preferably formed integrally with the body member 1 they may, if desired, be formed separately therefrom and be secured thereto so that their rear faces bear hard against the outer face of the body member so as to have no independent movement apart therefrom.

No parts of the device can become accidentally detached therefrom and the clamping screws are housed and protected, from injury and/or displacement, by the lugs 5 and clamping jaws 7.

What I claim is:—

1. A coupling device for use in the erection of scaffolding and like temporary structures comprising a body member composed of a pair of oppositely disposed fixed elements each forming one part of a pair of clamping devices, a pair of hinged elements forming the other parts of said pair of clamping devices co-operating with each of said fixed elements, and a pair of headed screw elements mounted in the body member with their heads adjacent said hinged elements whereby said screws cannot be removed from said body member when said device is in any position and arranged when withdrawn from said body member to coact with and force the hinged elements into clamping position.

2. A coupling device for use in the erection of scaffolding and like temporary structures comprising in combination a main body member, one element of a pair of clamping jaws formed integrally with and on opposite sides of said body member, a lug on each side of said body member, a screw threaded clamping screw operating in each of said lugs, hinge pins mounted in each of said lugs, a pair of clamping jaws pivotally mounted on said hinge pins and abutments on said clamping jaws with which the heads of the clamping screws co-operate, said clamping screws being so mounted in said lugs that when the coupling device is in any position, said screws cannot be removed from said lugs.

3. A coupling device for use in the erection of scaffolding and like temporary structures comprising in combination a main body member having one element of a pair of clamping jaws, with their longer axes disposed at right angles to each other, formed integrally with and on opposite sides of said body member, a lug on each side of said body member, a screw threaded clamping screw operating in each of said lugs, an enlarged head on said clamping screws, hinge pins mounted in each of said lugs, a pair of clamping jaws pivotally mounted on said hinge pins, abutments on said clamping jaws, and recesses formed in said abutments adapted to receive the enlarged heads on the clamping screws, said arrangement of said clamping screws preventing the removal of said screws when the device is in any position.

4. A coupling device comprising a body member having a pair of oppositely disposed fixed elements, each forming one part of a pair of clamping devices, a pair of hinged elements forming the other part of said clamping devices, an abutment on each hinged element, a pair of lugs on said body member, each positioned opposite to but spaced from an abutment on said hinged elements, threaded clamping screws having enlarged heads, in said lugs with their heads disposed in the spaces between said lugs and abutments and adapted to coact with said abutments to force said hinged elements into operative position, the disposition of said heads in said spaces preventing removal of said screws when said hinged elements are in any position.

GEORGE WILLIAM AMOR.